United States Patent [19]

Theocharous

[11] Patent Number: 4,713,538
[45] Date of Patent: Dec. 15, 1987

[54] OPTICAL FIBER APPARATUS AND METHOD FOR REMOTELY MEASURING AN EXTERNAL PARAMETER FROM A MONITORING POSITION

[75] Inventor: Evangelos Theocharous, London, England

[73] Assignee: Central Electricity Generating Board of Sudbury House, London, England

[21] Appl. No.: 681,852

[22] PCT Filed: Apr. 19, 1984

[86] PCT No.: PCT/GB84/00136
§ 371 Date: Dec. 12, 1984
§ 102(e) Date: Dec. 12, 1984

[87] PCT Pub. No.: WO84/04439
PCT Pub. Date: Nov. 8, 1984

[30] Foreign Application Priority Data

Apr. 26, 1983 [GB] United Kingdom ............... 8311256

[51] Int. Cl.$^4$ ............................................. G01D 5/34
[52] U.S. Cl. ................................. 250/227; 250/231 R
[58] Field of Search ............... 73/705, 800; 250/227, 250/231 R; 374/161

[56] References Cited

U.S. PATENT DOCUMENTS

| | | | |
|---|---|---|---|
| 4,281,245 | 7/1981 | Brogardh et al. | 250/227 |
| 4,459,477 | 7/1984 | Asawa et al. | 250/227 |
| 4,506,153 | 3/1985 | Ohno | 250/227 |
| 4,523,092 | 6/1985 | Nelson | 250/227 |
| 4,529,875 | 7/1985 | Brogardh et al. | 250/227 |
| 4,533,829 | 8/1985 | Miceli et al. | 250/227 |
| 4,554,449 | 11/1985 | Taniuchi et al. | 250/227 |
| 4,560,868 | 12/1985 | Brogardh et al. | 250/331 R X |
| 4,562,348 | 12/1985 | Brogardh et al. | 73/800 X |

*Primary Examiner*—Eugene R. LaRoche
*Assistant Examiner*—James C. Lee
*Attorney, Agent, or Firm*—Beveridge, DeGrandi & Weilacher

[57] ABSTRACT

An optical fiber apparatus measures an external parameter, such as temperature, at any of a number of different locations using time-domain reflectometry techniques. Sensor devices, each comprising a chip or plate of ruby glass, are interconnected by optical fibers. A laser launches along the fiber string short pulses of light at a first wavelength on the absorption edge of the ruby glass and a second wavelength in the transmission region away from the edge. A timer controls sampling circuits to measure backscattered energy at each wavelength at spaced times corresponding to spaced points along the fiber on opposite sides of a selected sensor device. A processor calculates the absorption loss in the sensor device at each wavelength by comparing the backscattered energy from the two points on opposite sides of the device, and calculates the differential absorption loss by comparing the losses at the two wavelengths. Embodiments employing a wedge shaped absorber are used to measure displacement. Signal to noise ratio is improved by incorporating retroreflectors in the fiber lengths between sensor devices.

14 Claims, 18 Drawing Figures

OPTICAL FIBER APPARATUS AND METHOD FOR REMOTELY MEASURING AN EXTERNAL PARAMETER FROM A MONITORING POSITION

BACKGROUND OF THE INVENTION

The present invention relates to apparatus and method for measuring an external parameter, eg, temperature, pressure or displacement.

It is sometimes required to measure external parameters (physical variables) in relatively inaccessible places where the use of electrical transducers for remote monitoring is inappropriate. For example, inside electrical machines such as transformers, generators or motors, no conventional electrical transducer can be used because of the high magnetic fields. It has been proposed to use optical techniques in such cases.

Some optical materials are known to exhibit a temperature dependence of some feature of their absorption spectrum. An optical thermometer can thus be made by arranging to pass light through such an optical material acting as a temperature transducer, and monitoring variations in the energy of light transmitted through the material with temperature. One such device is proposed in "An Optical Temperature Sensor for High Voltage Applications" by Saasky and Skaugset, in a paper given at the 7th IEEE/PES Transmission and Distribution Conference and Exposition, Apr. 1 to 6, 1979. This paper disclosed that selected materials appear to exhibit useful temperature dependent absorption spectra, but a preferred material is selenium ruby glass which exhibits a relatively sharp edge in its absorption spectrum where the absorption co-efficient rises from a relatively low value to a very high value rapidly with decreasing light wavelength. The location in the spectrum of this edge is temperature dependent so that the absorption co-efficient of such ruby glass to light at a specific wavelength on the absorption edge can be highly temperature dependent.

The above paper describes a possible temperature sensor comprising a pellet of the ruby glass sandwiched between a reflective coating and the end of a fibre optic bundle. Light from a suitable diode source is fed to the pellet along some of the fibres of the bundle passes through the pellet is reflected back through the pellet by the reflective coating and into the other fibres of the bundle to be fed to a photo-detector. The intensity of light detected should provide an indication of the temperature of the pellet.

This device has various drawbacks in that there may be other variables effecting the output for which the device does not compensate. Compensation is described in the paper only for any variations in the original light source.

A somewhat similar temperature sensor is described in "Fibre-optic Instrument for Temperature Measurement" by Kyuma, et al. in IEEE Journal of Quantum Electronics, Vol. QE-18, No. 4, April 1982. Again the temperature dependent absorption edge of a selected optical material is used as the sensing device. Two semiconductor materials, CdTe and GaAs are disclosed. Two lengths of single optical fibre are used to convey light from a source through a body of the temperature sensitive material and then back again to the photo-detector. However, in this arrangement, the light source is arranged to emit two pulses of light at different wavelengths, one wavelength selected to be on the absorption edge of the sensing material, and the other wavelength selected to be substantially away from the absorption edge, in the transmission region of the material. The intensities of the light of the two wavelengths transmitted through the sensor material are then measured and compared. In this way it is said that the resulting device is made relatively insensitive to changes in the light detector output resulting from effects other than the temperature dependency of the absorption edge of the sensor material. For example, the device can have other temperature dependent losses in the light path from the light source to the detector including optical connector loss at the interfaces between the optical fibres and the body of sensor material, and the scattering and other loss co-efficient in the optical fibres themselves. If the two wavelengths of light used in this device are of the same order, then it can be expected that variations in the unwanted loss co-efficients in the light path will be the same at both wavelengths. Thus, comparison of the received signals at the two wavelengths enables the measured absorption co-efficient at the wavelength on the absorption edge of the sensor material to be normalised to minimise dependence on loss co-efficients in the system other than the desired absorption co-efficient of the sensor material.

If temperatures are to be measured at several locations with the above prior art temperature sensors, then separate optical fibre connections must be made from the monitoring point to the sensors at each location. Furthermore, the sensor described by Saasky and Skaugset is susceptible to loss co-efficients other than the desired absorption loss, whereas that described by Kyuma et al. is susceptible to variations in the emitted light output of the light source.

A fibre optic temperature distribution sensor has also been proposed by Hartog and Payne in a paper given to the Colloquium on Optical Fibre Sensors organised by Professional Group E13, Electronic Division, Institution of Electrical Engineers, on May 26th, 1982. In this paper, it is proposed to make use of the temperature dependence of the back scatter signal from an optical fibre using optical time-domain reflectometry. A particular example is described employing liquid core fibre with a liquid known to exhibit substantial variations in refractive index and Rayleigh scatter with temperature. In optical time-domain reflectometry, a pulse of light is launched into one end of the optical fibre and the energy back scattered from various parts of the fibre along its length is then monitored at the launching end. The technique has similarities to radar in that the distance along the fibre from the launching end from which the back scattered light originated is dependent on the time delay following launching of the light pulse. In the described example in the above paper, the back scattered energy received at the launching end at any particular time, corresponding to a particular distance along the fibre, is directly dependent on the temperature at that point along the fibre. However, the back scattered energy from a uniform fibre at a uniform temperature along its length, decays exponentially with time, and so analysing the back scattered energy signal to provide indications of the temperature along the length of the fibre can be difficult.

It will be appreciated that optical time-domain reflectometry is known for testing the properties of optical fibres, especially attenuation. This is a technique used to test fibres used to achieve desired low levels of attenuation for use of optical fibres in communication systems and the like. Conduit, Hartog and Payne have described an improved method of measuring the attenuation at various points along the length of the fibre, entitled "Spectral- and Length-Dependent Losses in Optical Fibres Investigated by a Two-Channel Back Scatter Technique", published in Electronics Letters, Vol. 16, No. 3, Jan. 31st, 1980. In this technique, the back scattered energy at two temporally spaced times is measured, the times corresponding to a pair of spaced points along the length of the fibre being tested. By comparing the energies from the two spaced points along the fibre, the attenuation between them can be determined and this value is normalised to minimise the effect of any variation in the energy of the light pulse launched into the fibre. The above article appears concerned solely with measuring the properties of an optical fibre for testing purposes.

SUMMARY OF THE INVENTION

According to one aspect of the present invention, there is provided apparatus for measuring an external parameter at any selected one of a plurality of locations, comprising optical fibre serially interconnecting the locations from a monitoring position and extending beyond the farthest of said locations along the fibre from the monitoring position, sensing means comprising, at least at said locations, optical material through which can pass light travelling along the fibre from one location to the next and which has a spectral absorption profile such that the sensing means provides at the first wavelength an absorption co-efficient which is dependent on said external parameter and at a second wavelength an absorption co-efficient which is substantially independent of said parameter, light source means to launch into an end of the optical fibre at the monitoring position a first pulse of light at the first wavelength and a second pulse of light at the second wavelength, means to detect and measure at said launching end of the fibre the energy of back scattered light at each of said two wavelengths, timing means controlling the detecting and measuring means to measure the back scattered energies at the two wavelengths each at temporally spaced times selected relative to the time of launching each of said pulses of light so as to correspond to energy back scattered from a pair of spaced points along the fibre on opposite sides of the selected one of the locations, and computing means connected to receive from said detecting and measuring means signals representing the four measured back scattered energies and arranged to compute therefrom a value for said parameter at the selected location, which value is normalised to minimise any dependency on the launching energy of the light pulses or on loss co-efficients between said points other than absorption.

It may now be appreciated that the above described aspect of the present invention provides a multiple measuring point, or distributed, thermometer using only one optical fibre light path interconnecting all the sensing locations. By measuring the back scattered energy at two times, relative to each light pulses, corresponding to scattering points on opposite sides of a sensing location, the light absorption between the two points, through the optical material at the location can be determined whilst any dependency on the stability of the emitting light source for example is minimised. Also, by using the two wavelengths only one of which is affected by the temperature dependent absorption co-efficient, the resultant absorption value measured by the apparatus can be normalised to eliminate other loss co-efficients which might corrupt the desired indication.

The sensing means at each location may comprise portions of optical fibre at the locations. If these portions are optically matched and connected to lengths of interconnecting optical fibre then geometrical losses can be minimised. Indeed, the portions may comprise parts of a continuous length of optical fibre including the interconnecting fibre, the portions being locally doped to provide the desired spectral absorption profile.

Alternatively, a single continuous length of optical fibre with said desired spectral absorption profile may be used to constitute both the interconnecting optical fibre and the sensing means.

In another arrangement, however, the sensing means comprise optical sensor devices incorporating bodies of said optical material and optically interconnecting separate lengths of the optical fibre. For example, the bodies of optical material may comprise chips or slices of ruby glass for use as a temperature sensor.

The external parameter to be measured by the apparatus is typically temperature. However the apparatus may be used to measure other parameters including displacement or pressure.

In one arrangement, the optical sensing devices are formed as displacement transducers at said locations, each comprising a body of optical material and having in a transmission direction through the body an absorption co-efficient at said first wavelength which is graduated in a translation direction transverse to the transmission direction, and means mounting the body so as to interconnect separate lengths of optical fibre by an optical path through the body and to permit translational movement of the body relative to the optical path in said translation direction in accordance with the displacement to be measured. In a preferred embodiment, the body of optical material used in the displacement transducers is formed of a first wedge of the optical material having a predetermined absorption co-efficient per unit distance in the material and a second wedge of substantially the same angle as the first and made of a material having substantially the same refractive index as the optical material of the first wedge and being highly transparent with substantially no absorption, the two wedges being cemented together to form a body of uniform thickness. A suitable optical material for the displacement transducer is neodymium ($Nd^{3+}$) doped glass, which has an absorption band centred at a particular wavelength so that said first wavelength can be selected to be within the absorption band and the second wavelength to be outside the absorption band.

In the above described arrangement with displacement transducers, the optical sensing devices may additionally include temperature transducers, each comprising a further body of optical material through which the light passes and having an optical absorption spectrum with an absorption edge which is temperature dependent but extends over a range of wavelengths outside the absorption band of the displacement transducer material. The second wavelength is then selected to be away also from the edge and the light source means is arranged additionally to launch a third pulse of light at a third wavelength on said absorption edge. The detecting and measuring means and the computing means are arranged additionally to measure the back scattered energies at the third wavelength and to compute a normalised value for the temperature from signals representing these back scattered energies at said third and second wavelengths.

In this way, a single apparatus can be provided enabling the measurement of both displacement and temperature at the various sensing locations with a single optical fibre interconnection.

From another aspect, the invention provides apparatus for remotely measuring values of an external parameter at a plurality of locations from a monitoring position, the apparatus comprising an optical sensor device at each of the locations, lengths of optical fibre serially interconnecting the sensing devices to the monitoring position with the monitoring position at one end of the string of interconnected devices, the optical sensor devices each being arranged to permit light to pass from one optical fibre length to the next with a loss co-efficient through the sensor device which is dependent on the external parameter to be measured, means for launching light pulses into the end of the optical fibre length at the monitoring position and monitoring the back scattered energy emerging from said fibre end to determine said loss co-efficients at selected sensor devices by optical time-domain reflectometry.

In a further aspect of the present invention, there is provided apparatus for optically measuring a displacement, comprising an optical displacement transducer, optical fibre means to feed light from a monitoring position to the transducer and to supply back to the monitoring position an optical signal generated by the transducer by modulation of said light fed thereto, the transducer comprising a body of optical material, optically interconnecting light from and to the optical fibre means by means of a light path through the body, and having in a transmission direction through the body an absorption co-efficient which is graduated in a translation direction transverse to the transmission direction, and means mounting the body for translational movement of the body relative to the optical path in said translation direction in accordance with the displacement to be measured, thereby modulating the light passing through the body to generate said optical signal.

Still further, the present invention envisages a method of measuring an external parameter at any selected one of a plurality of locations serially interconnected by optical fibre from a monitoring position, comprising providing sensing means comprising, at least at said locations, optical material through which can pass light travelling along the fibre from one location to the next and which has a spectral absorption profile such that the sensing means provides at a first wavelength an absorption co-effient which is dependent on said external parameter and at a second wavelength an absorption co-efficient which is substantially independent of said parameter, launching into an end of the optical fibre at the monitoring position a first pulse of light at the first wavelength and a second pulse of light at the second wavelength, detecting and measuring at said launching end of the fibre the energy of back scattered light at each of said two wavelengths at two temporally spaced times selected relative to the time of launching each of said pulses of light so as to correspond to energy back scattered from a pair of spaced points along the fibre on opposite sides of the selected one of the locations, and computing from said four measured back scattered energies a value for said parameter at the selected location which value is normalised to minimise any dependency on the launching energy of the light pulses or on loss co-efficients between said points other than absorption.

BRIEF DESCRIPTION OF THE DRAWINGS

Examples of the present invention will now be described with reference to the accompanying drawings in which.

DESCRIPTION OF THE PREFERRED EMBODIMENTS

Figure 1:
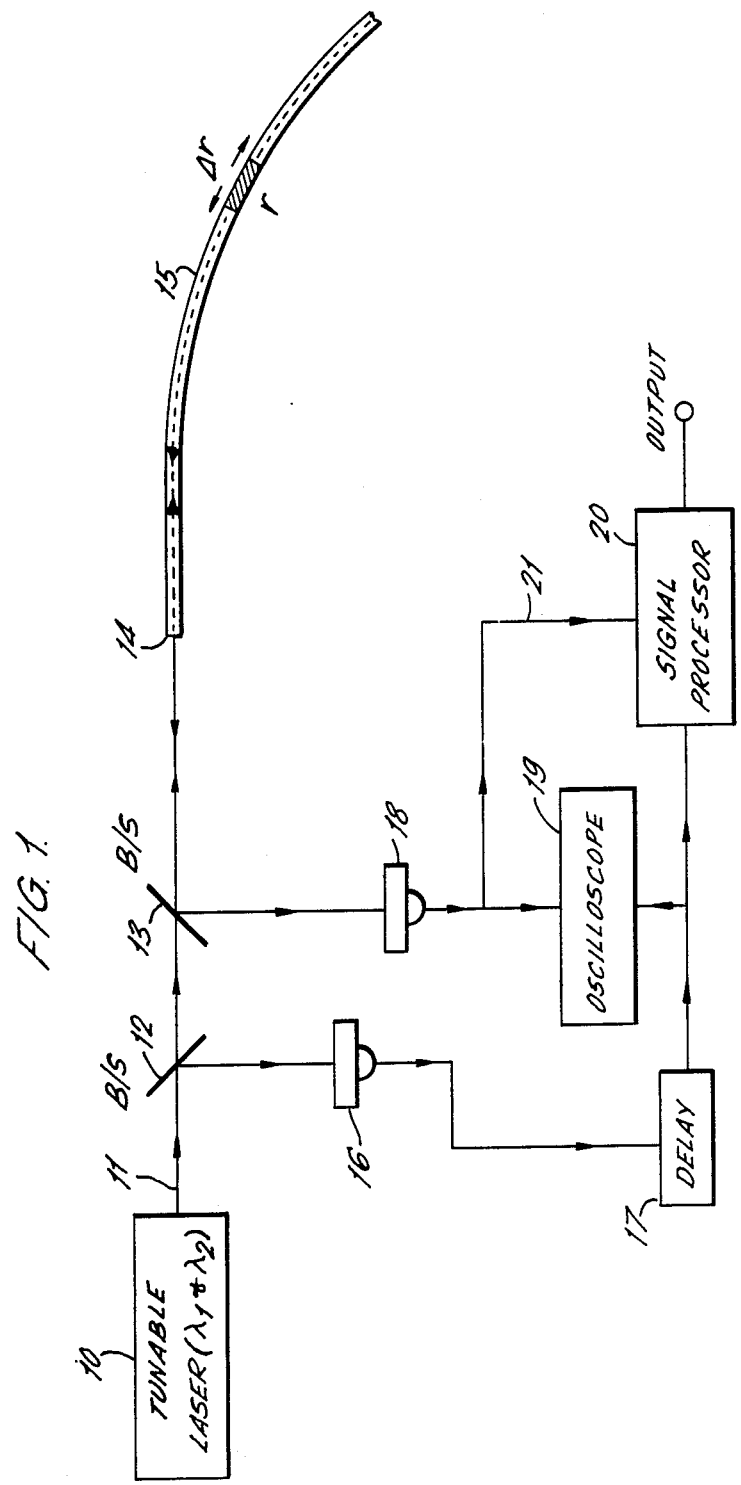
FIG. 1 is a block schematic diagram of optical time-domain reflectometry apparatus which can embody the present invention.
Figure 2:
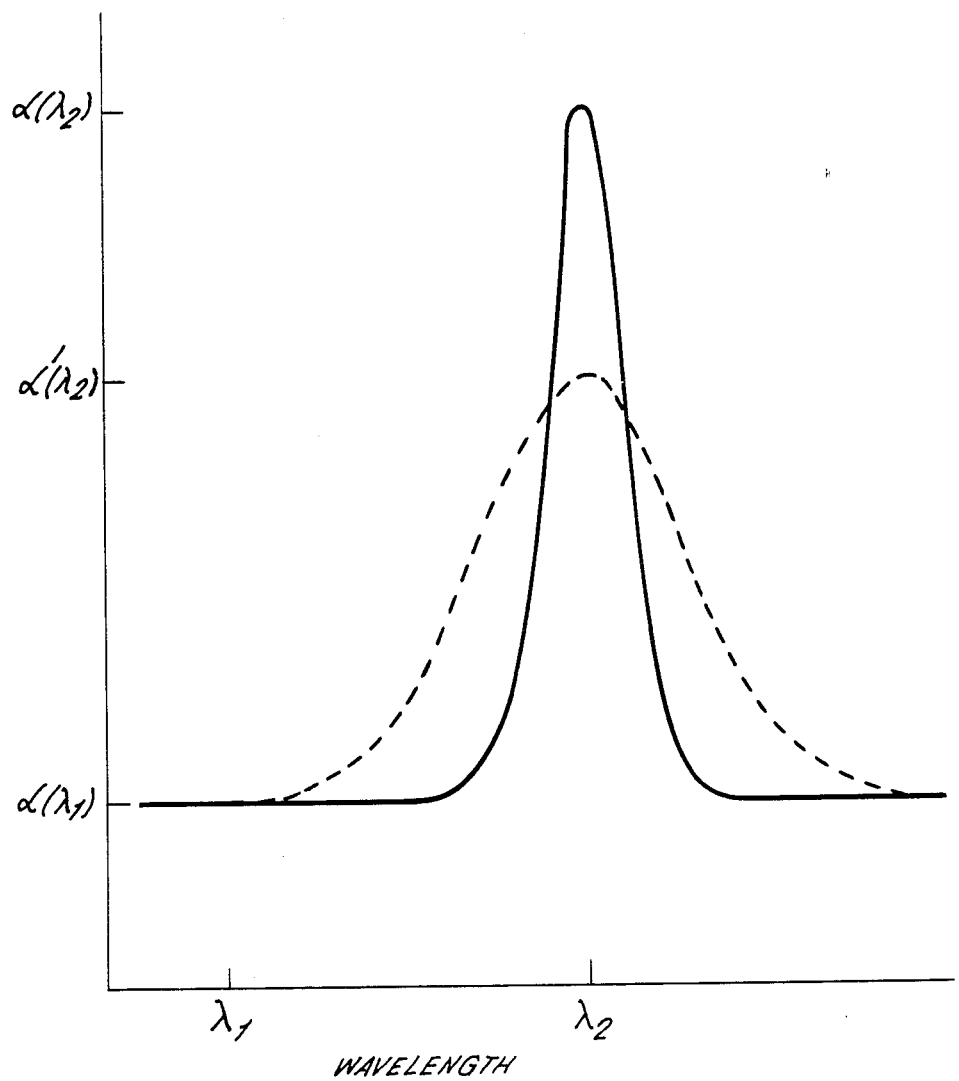
FIG. 2 is a graphical representation of an absorption band in an optical material.

Referring to FIGS. 1 and 2, the apparatus illustrated in FIG. 1 comprises a tuneable laser 10 supplying a beam of light 11 at a wavelength $\lambda$ via two successive beam splitters 12 and 13 into one end 14 of a length of optical fibre 15. The arrangement for launching the laser light into the optical fibre is not shown in the figure but standard techniques can be employed for this purpose. Light entering the optical fibre is conducted along the fibre and, as is known, a portion of the light is scattered in the material of the fibre and a proportion of the scattered energy is recaptured by the fibre to travel back along the fibre towards the launching end 14.

Thus, back scattered light energy emerges from the end 14 and travels back towards the beam splitter 13.

The first splitter 12 splits the output of the laser to provide a reference beam to a first photo-detector 16. The laser output is provided in short pulses of light and the first photo-detector 16 generates a start signal in response to the output pulse to trigger a delay unit 17.

The second beam splitter 13, deflects the back scattered light energy to a second photo-detector 18 which generates a signal corresponding to the back scattered energy. The back scattered energy signal is displayed on an oscilloscope 19 and supplied also to a signal processor 20.

In operation, as will be described later, the apparatus of FIG. 1 is arranged so that the signal processor 20 can determine from the back scattered energy signals supplied on line 21 the absorption co-efficient of the optical fibre 15 at predetermined locations a selected distance r from the launching end 14 of the fibre. In this example of the invention, the fibre 15 is made of a selected optical material which has at one wavelength of light an absorption co-efficient which is dependent on some external parameter or physical variable, typically temperature. At another wavelength, the absorption co-efficient of the optical material is substantially independent of the external parameter.

In one example, the optical fibre 15 is made of a material, comprising a doped glass, which has an absorption band at a predetermined first wavelength. A typical absorption spectrum may be as illustrated in FIG. 2 by the solid line, which shows a maximum of absorption at a wavelength $\lambda_2$. The material is such that the profile of the absorption band changes with changes in some parameter external to the optical material, such as temperature. For example, the absorption band may be broadened, and reduced in height, with increase in temperature such as illustrated by the dotted line in FIG. 2. It can be noted from FIG. 2 that variation in temperature has substantially no effect on the absorption co-efficient at wavelengths away from the absorption band such as second wavelength $\lambda_1$. In FIG. 2, $\alpha(\lambda_2)$ is the absorption co-efficient at wavelength $\lambda_2$ at a first temperature, $\alpha'(\lambda_2)$ is the absorption co-efficient at wavelength $\lambda_2$ at an elevated temperature and $\alpha(\lambda_1)$ is the absorption co-efficient at wavelength $\lambda_1$.

Figure 3:
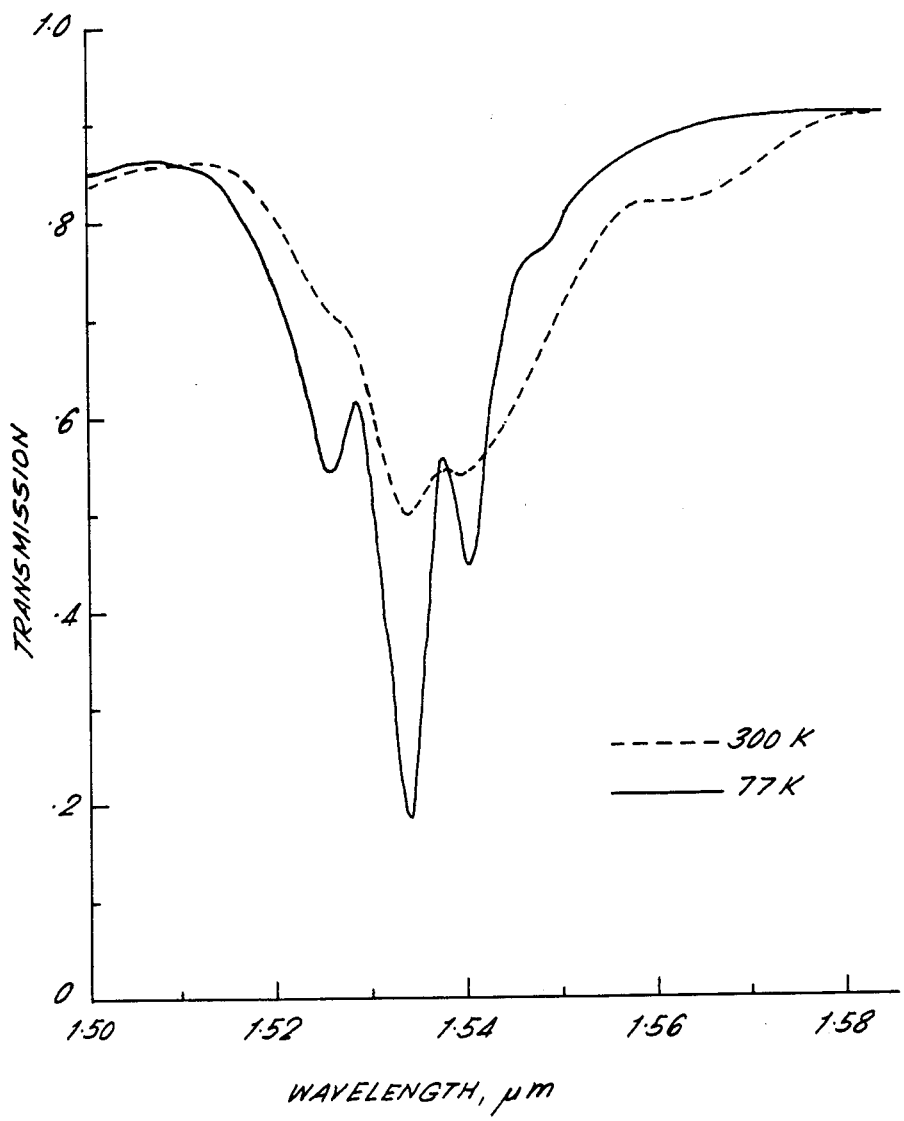
FIG. 3 if a graphical representation of an absorption band in erbium doped glass which is temperature dependent.

One example of an optical material which exhibits this property is silicate glass doped with Erbium ($Er^{3+}$). Such a material can be made by introducing 2.5 weight % $Er_2O_3$ in silicate glass. The absorption profile around the peak 1.538 microns at 77° K. and 300° K. is illustrated in FIG. 3. A similar profile may be obtained with neodymium doped glass.

Figure 4:
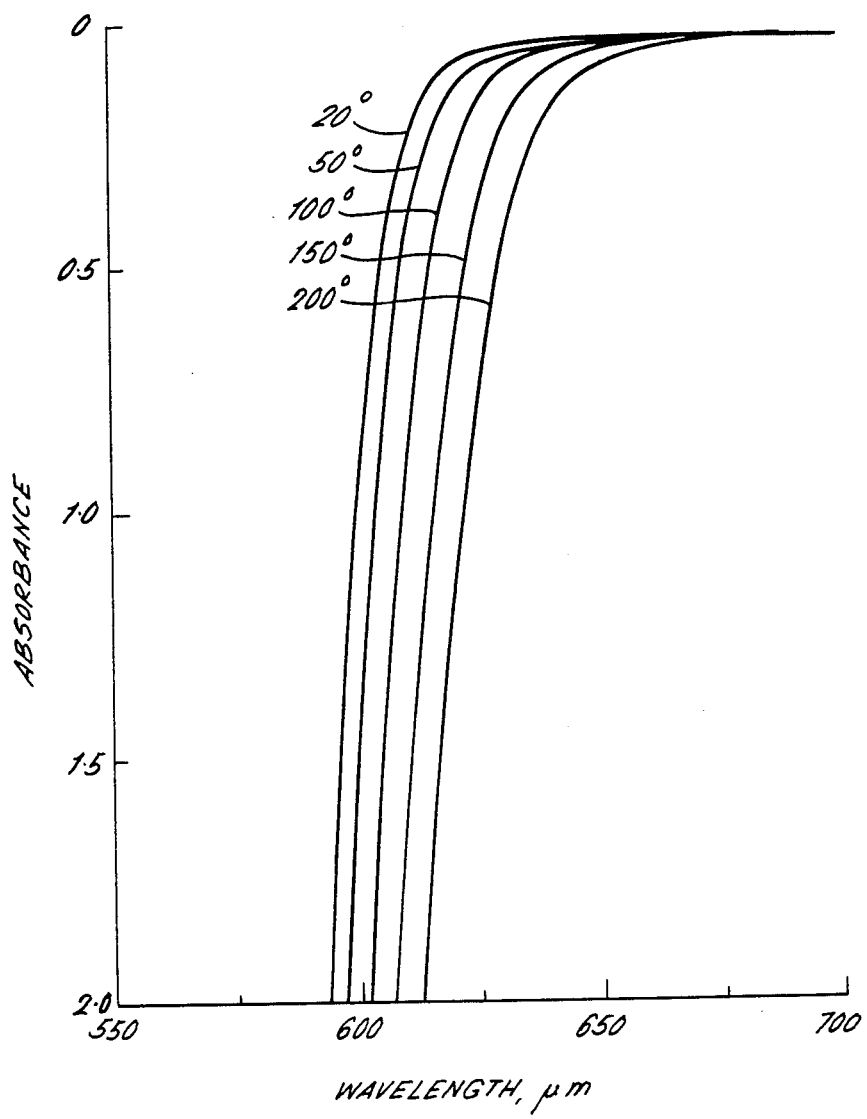
FIG. 4 is a graphical representation of an absorption edge in ruby glass which is temperature dependent.
Figure 5:
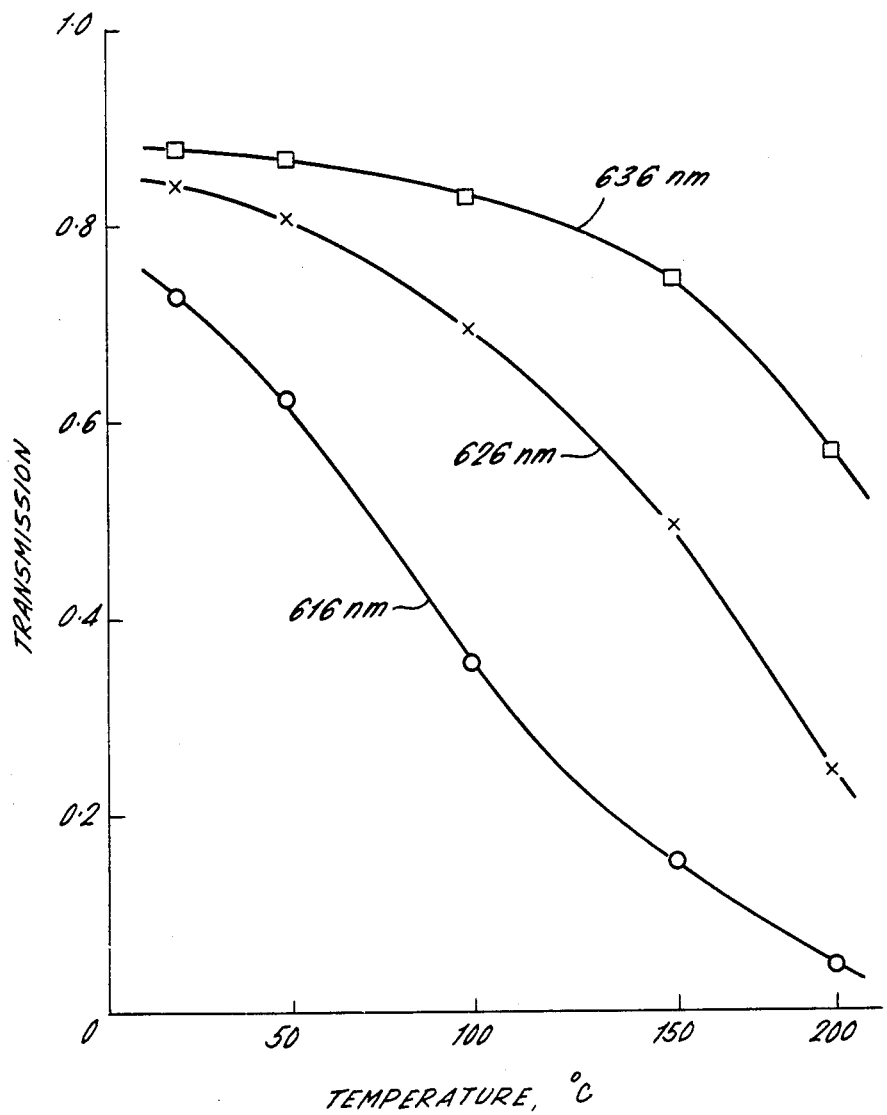
FIG. 5 is a graphical representation of the variation of transmission co-efficient of ruby glass at different light wavelengths.

Some optical materials exhibit an absorption edge in their absorption spectra. One such material is ruby glass. A range of selenium and sulphur doped ruby glasses are available which have absorption edges at different characteristic wavelengths from around 350 to around 1000 nm. The absorption profile of a typical ruby glass (RG610) of two millimeter thickness is illustrated in FIG. 4. The location of the absorption edge is temperature dependent as shown in the figure. It can be seen that the absorpton co-efficient at a wavelength located on the absorption edge is highly temperature dependent whereas the absorption co-efficient at longer wavelengths than the edge is substantially independent of temperature, and at a very low value. FIG. 5 illustrates graphically the variation of the transmission co-efficient through a two millimeter thick ruby glass plate (RG610) at three different wavelengths.

Referring back again to FIG. 1, the tuneable laser 10 is arranged to emit two pulses of light respectively at the wavelengths $\lambda_1$ and $\lambda_2$. The pulses are spaced in time sufficiently to enaable back scattered energy from all points of the optical fibre from the first pulse to be received by the photo-detector 18 before launching the second pulse into the fibre. Instead of a single tuneable laser, two separate diode lasers operating at $\lambda_1$ and $\lambda_2$ respectively may be used. Further, optical fibre couplers may be used instead of the beam splitters 12 and 13, in which case light is conducted by optical fibre directly from the lasers and to the photo-detectors.

The delay unit 17 defines the position along the length of the fibre at which the absorption co-efficients at the two wavelengths $\lambda_1$ and $\lambda_2$ of the material of the fibre are to be measured. The delay unit 17 supplies successive trigger pulses at predetermined spaced times following the emission of the pulses by the laser 10 as detected by the photo-detector 16, to the signal processor 20, and also to the oscilloscope 19. The delay unit 17 defines the same pair of temporally spaced points along the length of the fibre for each of the two pulses at the two wavelengths emitted by the laser.

Figure 6:
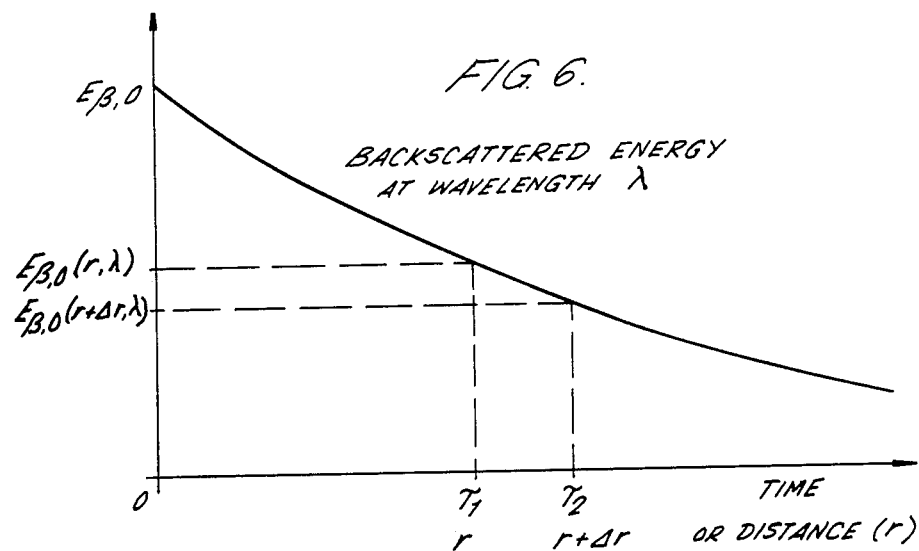
FIG. 6 is a graphical representation of the exponential decay of back scattered energy in an optical fibre.

The signal processor 20 is arranged to determine from the back scattered energy signal on line 21 the back scattered energy from the two points defined by the delay units 17 at each of the two wavelengths. These four back scattered energy signals are then used by the signal processor to determine the absorption co-efficient of the section of optical fibre between the two points eg, from a distance r to a distance r+$\Delta$r. In the absence of any temperature variation along the length of the fibre 15, the back scattered energy $E_{\beta,o}$ which is received at the launching end 14 of the fibre decays with time exponentially as shown in FIG. 6. Thus, the back scattered energy measured at a time $\tau_1$, corresponding to energy back scattered from a point a distance r along the length of the fibre, is $E_{\beta,o}(r,\lambda)$ at a wavelength $\lambda$; and that at a later time $\tau_2$, corresponding to a distance r+$\Delta$r is $E_{\beta,o}(r+\Delta r,\lambda)$. It can be shown that the difference $\Delta\alpha(r)$ between the absorption co-efficients at the two wavelengths $\lambda_2$ and $\lambda_1$ at the point r from the end of the fibre is given by the following expression.:

$$\Delta\alpha(r) = \frac{1}{2\Delta r} \ln \frac{E_{\beta,o}(r,\lambda_1)E_{\beta,o}(r+\Delta r,\lambda_2)}{E_{\beta,o}(r,\lambda_2)E_{\beta,o}(r+\Delta r,\lambda_1)}$$

The signal processor 20 is arranged to perform this function and to provide on an output line 22 a signal representative of this differential absorption at the two wavelengths which is representative of the external parameter to be measured at the point r along the fibre.

In the example shown in FIG. 1, the entire optical fibre 15 is formed of the optical material with the required spectral absorption profile. This arrangement, of course, enables the external parameter to be measured at any selected position along the length of the fibre or any combination of such positions. However, it will be sufficient for most applications if the parameter can be measured only at selected predetermined positions along the length of the fibre and then the fact that the length of fibre between those locations at which the parameter is to be measured also has a substantial absorption co-efficient at the wavelength $\lambda_2$ is a serious disadvantage in that the energy of light at that wavelength is substantially attenuated in travelling from location to location.

Furthermore, the manufacture of a suitable continuous optical fibre of ruby glass in particular is problematic, though not impossible.

Figure 8:
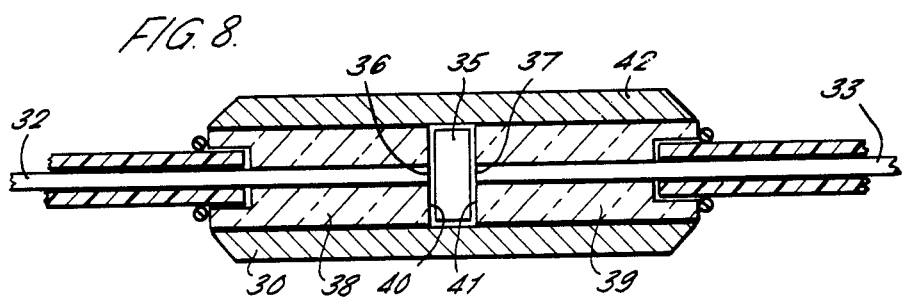
FIGS. 8 and 9 are cross-sectional views of embodiments of coupling interconnecting transducer elements between the ends of two lengths of optical fibre.
Figure 7:
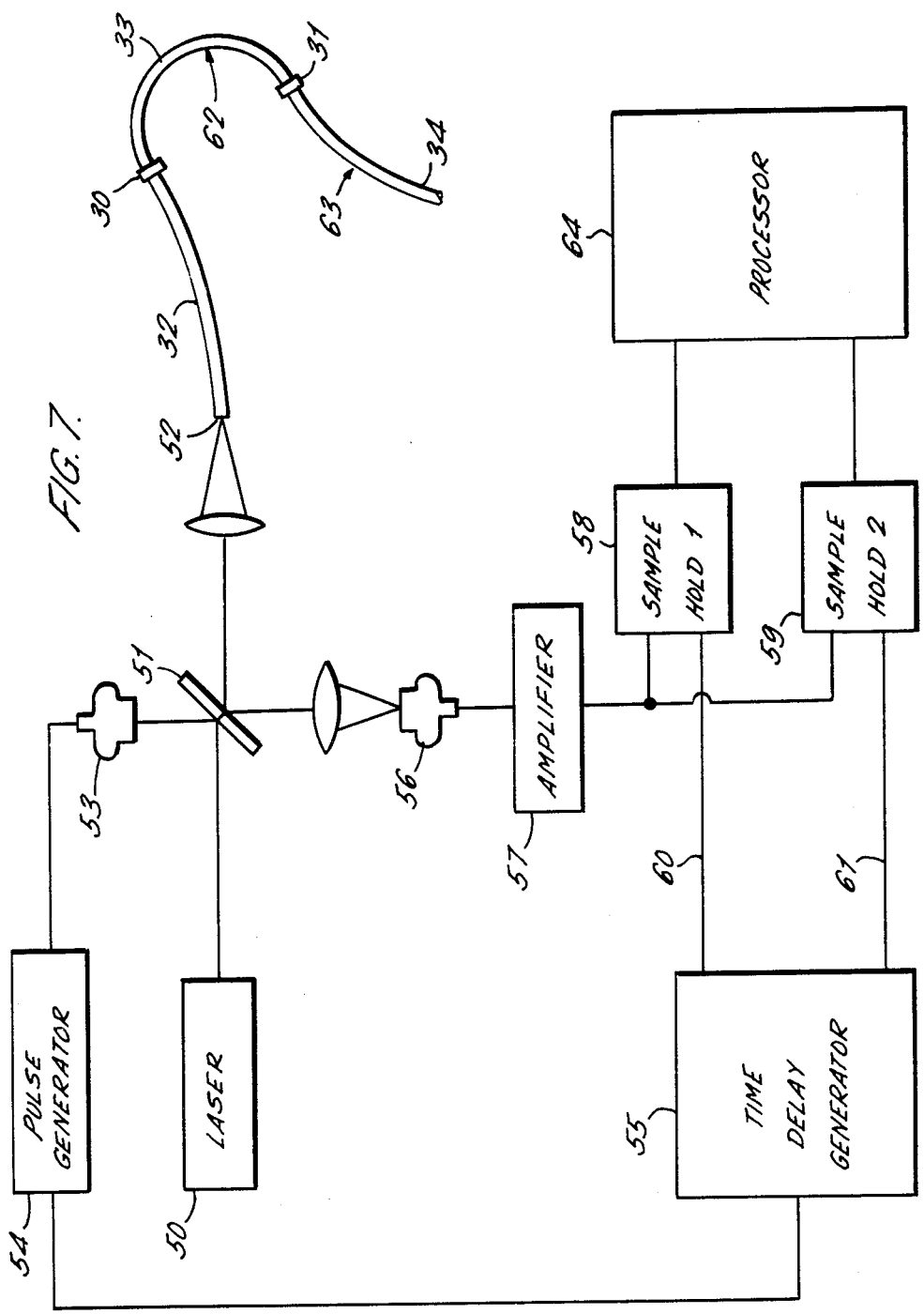
FIG. 7 is a block schematic diagram of an alternative embodiment of the present invention employing separate transducer elements interconnected by fibre lengths.

FIG. 7 illustrates diagrammatically an alternative form of apparatus which employs discrete sensing devices 30, 31 etc, which are themselves interconnected by separate lengths 32, 33, 34 etc, of optical fibre. One such sensing device 30 may be as illustrated in FIG. 8. A body or plate 35 of the specific optical material, eg, ruby glass, is located so as to provide an optical path through the body interconnecting the adjacent ends of 36 and 37 of the two separate lengths 32 and 33 of optical fibre on opposite sides. Light travelling from the source end of the fibre to the sensing device 30 is emitted at the end 36 of the fibre length 32, passes through the plate 35 of optical material and enters the end 37 of the next length 33 of fibre suffering appropriate loss due to the absorption co-efficient of the material of the body 35.

The sensing device 30 is formed by cementing the end portions of the fibre length 32 and 33 into respective capillary tubes 38, 39. Each capillary tube 38, 39 has its inner diameter accurately equal to the outer diameter of the fibre. The bores of the capillaries are themselves accurately central within the outer diameter of the capillary. The opposing end faces 40, 41 of the capillaries and the optical fibre lengths cemented therein are polished parallel to one another and inserted into opposite ends of a common tube 42 so as to sandwich between them the plate 35 of ruby glass. The internal diameter of the common tube 42 is made accurately equal to the outer diameter of the capillaries 38 and 39 so that the end 36 and 37 of the fibre lengths are accurately aligned on opposite sides of the plate. The coupling loss between the fibre lengths at such a joint is relatively insensitive to the longitudinal spacing between the fibre end faces 36 and 37. Thus the ruby plate 35 may have substantial thickness (2 millimeters). Reflection losses in the coupling can be reduced by using a refractive index matching epoxy cement. This effectively eliminates the glass to air interfaces.

Figure 9:
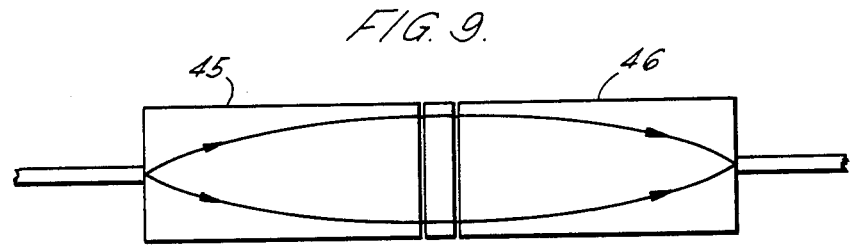

Graded-index rod lenses may also conveniently be used for coupling the light from one optical fibre length into another via a ruby glass chip, such as in the arrangement shown in FIG. 9. These graded-index rod lenses 45, 46 are formed with a refractive index which reduces radially outwardly and has the effect of collimating light emitted from the end of an optical fibre cemented to the rod at one end.

With a plurality of separate sensing devices such as illustrated in FIG. 7, an arrangement similar to that shown in FIG. 1 can be used to determine the differential adsorption at the two wavelengths $\lambda_1$ and $\lambda_2$ of any selecting one of the sensor devices. A tuneable laser 50 capable of generating pulses of light at the two wavelengths emits a beam of light via a beam splitter 51 which is focused into the launching end 52 of the first fibre length 32. The beam splitter supplies a reference beam to a first photo-detector 53 which triggers a pulse generator 54 to control a time delay generator 55. Back scattered light received from the fibre is deflected by the beam splitter 51 to a second photo-detector 56 generating a signal corresponding to the back scattered energy, which is supplied to an amplifier 57 and thus to a pair of sample and hold circuits 58 and 59. As before, the time delay generator 55 is arranged to generate sampling pulses on lines 60 and 61 at two temporally spaced times relative to the times of launching the pulses into the end 52 of the optical fibre. In this example the time delay generator is arranged to control these time delays so as to sample the back scattered energy at pairs of points along the string of fibre lengths on opposite sides of the selected sensor device. Thus, if the differential absorption at the device 31 is to be measured, then the time delay generator 55 produces sampling pulses at times corresponding to the back scattered energy from points 62 and 63 in fibre lengths 33 and 34 respectively. These energies are sampled and held in units 58 and 59 and supplied respectively to a processor 64. Thus, the processor 64 receives signals corresponding to the back scattered energy at each of points 62 and 63 for each of the two wavelengths $\lambda_1$ and $\lambda_2$. The processor computes from these values the differential absorption between the points 62 and 63. The fibre lengths 32, 33, 34 etc, are made of a highly transparent material with minimal absorption and correspondly the little temperature dependence. Accordingly, the measured differential co-efficient of absorption between the points 62 and 63 is primarily that caused by the ruby plate in the sensor device 31. By employing light at the two wavelengths, substantially all other loss co-efficients between the points 62 and 63 which may be dependent on external parameters such as temperature can be conpensated for, provided the two wavelengths $\lambda_1$ and $\lambda_2$ are sufficiently close that these other loss co-efficients are effective equally at the two wavelengths. Furthermore, by employing measurements of the back scattered energy at two temporally spaced times corresponding to points on either side of the sensor device 31, any dependence of the output signal on fluctuations in the laser pulse output intensity, or the sensitivity of the photo-detector 56 or of the amplifier 57 is substantially eliminated. It is only necessary for the photo-detector 56 and the amplifier 57 to be substantially stable during the time period between the two sampling times, which is very short.

Figure 10:
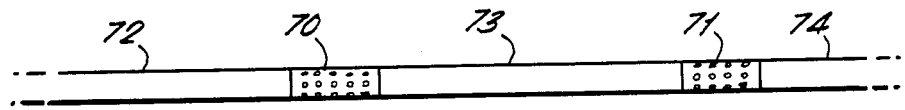
FIGS. 10 and 11 illustrate alternative arrangements for providing discrete transducer elements at locations along the length of an optical fibre.

It will be appreciated that it is desirable to minimise any losses for light travelling from fibre length to fibre length along the string of fibres, other than the absorption loss in the sensor devices at the wavelength $\lambda_2$. The smaller these extraneous losses, the greater the total length of the fibre string that may be employed with a consequent greater number of sensor devices along the length of the string. Geometrical losses at the couplings between the optical fibre ends on opposite sides of the ruby glass plates can be minimised by forming the ruby glass as short lengths of ruby glass core optical fibre of the same dimensions as the optical fibre itself. The optical fibre length can then be directly fused to the ruby glass core fibre in the manner as shown in FIG. 10 in which two ruby glass core fibre section 70 and 71 are illustrated fused between lengths 72, 73 and 74 of optical fibre. Geometrical losses can be eliminated altogether by forming the sensor devices as part of a continuous length of optical fibre. To form the sensor devices, short sections 75, 76 (FIG. 11) of the fibre are doped to provide the required spectral absorption profile. The rest of the fibre remaining highly transparent at both wavelengths. The doping at the point 75, 76 may be accomplished by ion implantation.

In the above described examples of the invention, the external parameter which is measured is temperature.

However, other parameters may be measured such as pressure, magnetic field or electric field.

Figure 12:
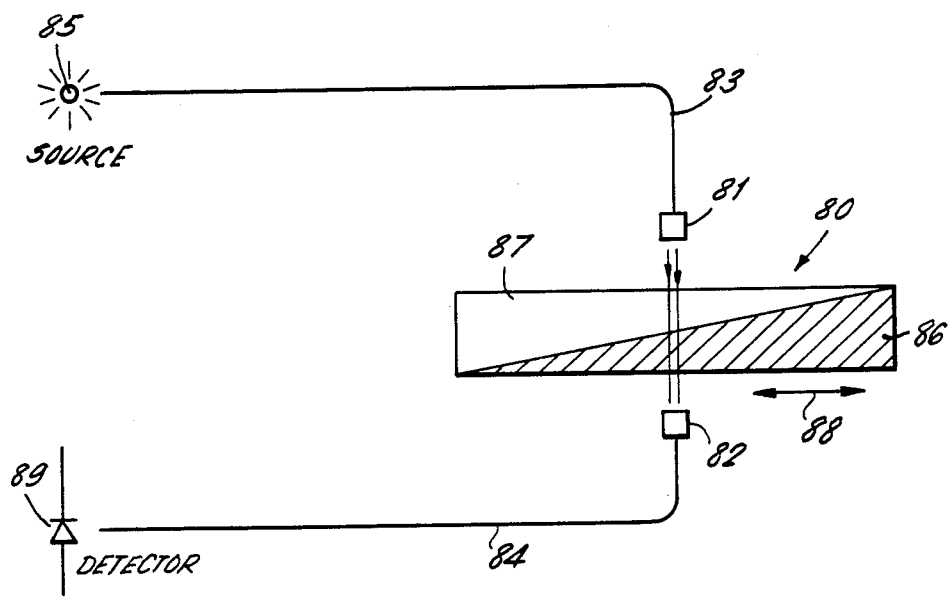
FIG. 12 illustrates a displacement transducer embodying the present invention.

Referring to FIG. 12, an arrangement is illustrated for measuring displacement. In FIG. 12, a body 80 of optical material is provided between ends 81 and 82 of optical fibres 83 and 84, so that light transmitted along fibre 83 from a source 85 is coupled from the end 81 into the end 82 of fibre 84 via a light path passing through the body 80. The body 80 is formed as two identical wedges 86 and 87 of optical material cemented together so that opposite faces of the body 80 are accurately parallel. The material of the two wedges 86 and 87 have substantially the same refractive index so that there is substantially no deviation of light passing through the body from fibre 83 to fibre 84. The wedge 86 is made of a material having a predetermined co-efficient of absorption per unit of light path length through the body. The wedge 87, on the other hand, is made highly transparent at the wavelength of light from the source 85. It can be seen therefore that the absorption co-efficient for light passing right through the body 80 is dependent on the position of the body relative to the light path between the ends 81 and 82 of the fibres 83 and 84. The body 80 is mounted relative to the fibres 83 and 84 so as to be moved transversely of the light path, ie, in the direction of arrows 88 in accordance with the displacement to be measured by the transducer.

A detector 89 detects light transmitted through the body 80 as conducted by the fibre 84. The energy of light received by the detector 89 provides an indication of the position of the body 80 and thence of the displacement to be measured.

Figure 11:
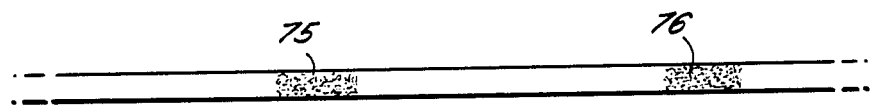
Figure 13:
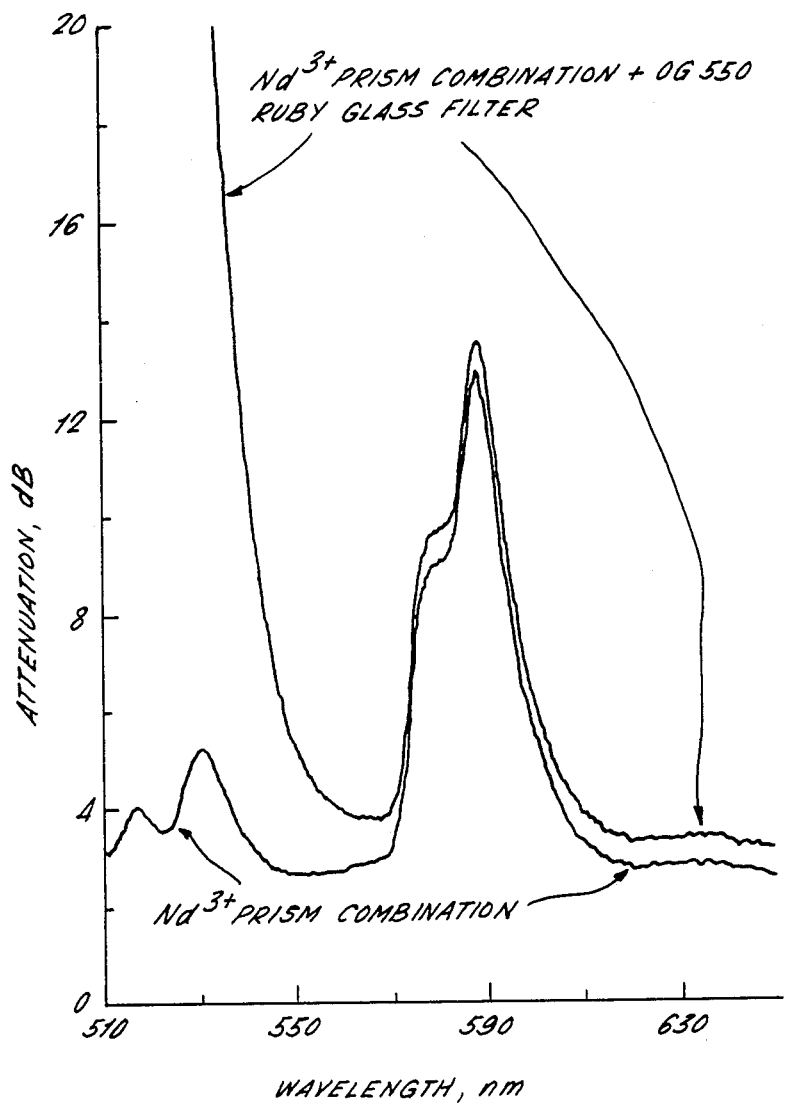
FIG. 13 is a graphical representation of the absorption band of a neodymium doped glass together with the combined absorption spectrum of a neodymium doped glass plate in series with a ruby glass plate.

Several displacement transducers as illustrated in FIG. 11 may be used simultaneously interconnected by lengths of optical fibre forming a string in the same manner as illustrated in FIG. 7. Then the displacement indicated by any selected one of the transducers can be measured using the time-domain reflectometry techniques described above. Preferably then, the optical material from which the wedge 86 is formed is one having a well defined absorption band but which is highly transparent away from the absorption band. FIG. 13 provides a graphical illustration of an absorption band with a peak at 585 nm as provided by glass doped with neodymium ($Nd^{3+}$). Then the source may be arranged to emit light at two wavelengths, one in the absorption band, eg, at 585 nm, and the second wavelength away from the absorption band, eg, at about 630 nm. Only the light at the wavelength in the absorption band is variably absorbed with displacement of the body of the transducer. If the detector is arranged to detect the absorption co-efficient at the two different wavelengths through the displacement transducer, these two values can be used to normalise the displacement indication to minimise dependency on other loss co-efficients which may be dependent on various external parameters but have substantially equal effects at both of the two wavelengths.

A single optical fibre system may be used to measure both temperature and displacement at a single combination transducer. If each sensing device is formed as a displacement transducer as described above together with a ruby glass plate in series so that light from one optical fibre passes through both the ruby glass plate and the body of the displacement transducer before entering the next optical fibre, then both temperature and displacement at the combination transducer can be measured. If the displacement transducer includes neodymium doped glass as the absorbing optical material, then the wavelength, 585 nm which is absorbed by the displacement transducer can be different from the wavelength of the absorption edge of a specific form of ruby glass, ie, 550 nm for glass OG550. The combined absorption spectrum of the displacement transducer and ruby glass element is illustrated also in FIG. 13. With this arrangement the light source is arranged to provide three wavelengths of light, at about 550 nm so as to be on the absorption edge of the ruby glass, at about 585 nm to be in the absorption band of the neodymium doped displacement transducer and at about 620 nm as a reference wavelength. Temperature variations should then have minimal effect on the absorption of light at 585 and 620 nm, whereas displacement variations have minimum effect on the light at wavelengths 550 and 620 nm.

It may be appreciated that the optical time domain reflectometry multiplexing techniques described above with reference to FIG. 7, may be used also with the combined displacement and temperature transducer described above. However, an alternative arrangement is illustrated in FIG. 14.

Figure 14:
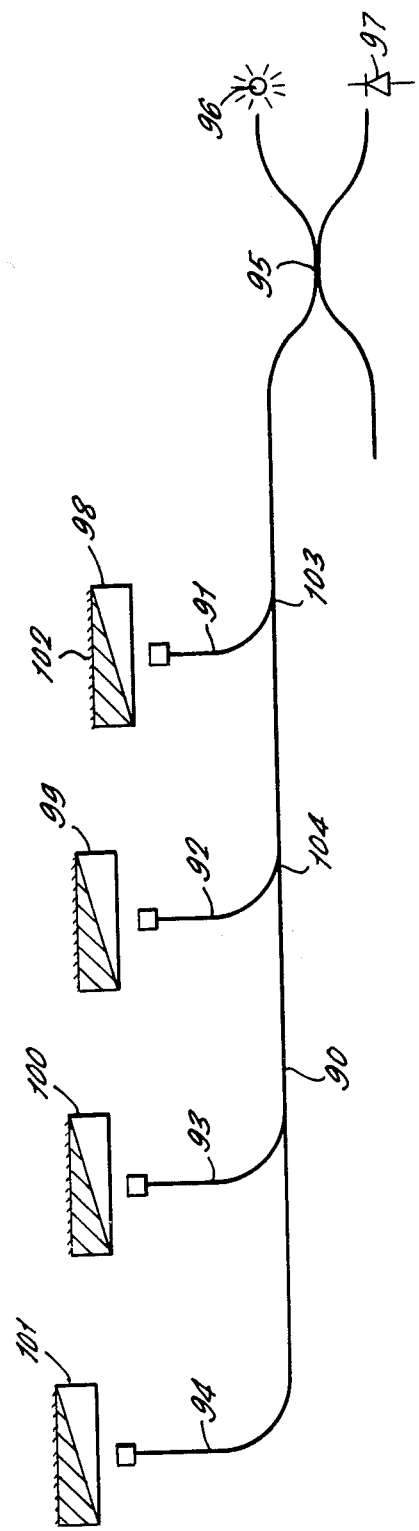
FIG. 14 illustrates an alternative method of multiplexing a number of transducer elements spurred off at various positions along the length of an optical fibre.

In FIG. 14, the string of transducer elements interconnected by lengths of optical fibre is replaced by an optical fibre length 90 to which are connected optical fibre spurs 91, 92, 93 and 94. The spurs are connected to the length 90 optical fibre by fibre couplers. A fibre coupler 95 may also be used replacing the beam splitter of FIG. 7, enabling light from a diode source 96 to be fed into the fibre length and returning modulated light to be fed to a photo-sensor 97. Each of the spurs 91 to 94 is terminated at a displacement transducer 98, 99, 100 and 101. Each displacement transducer is formed in the same manner as shown in FIG. 11 except that one face of the transducer body is made reflecting. The end of the fibre spur (91 to 94) is optically linked to the body of the displacement transducer so that light emerging from the fibre spur 91 passes through the body, is variably absorbed by the wedge 86, is reflected at the reflecting surface 102 and passes back through the body to re-enter the end of the fibre spur 91.

It can be seen that the returning reflected light from a single pulse of light fed into the end of the fibre length 90 from the source 96 is received by the detector 97 as a time space series of pulses with the time spacing depending on the length of the fibre elements between one spur connection 103 and the next 104 along the fibre 90. Accordingly, the signals from each of the transducers can be separately monitored by appropriate timing techniques.

Referring again to the time-domain reflectometry back scattering method of multiplexing illustrated in FIG. 7, there is a limit to the number of individual transducer elements which can be usefully connected in series. The energy of light back scattered from elemental sections of optical fibre is inherently very small relative to the power of the light pulse launched into the fibre. The farther along the fibre string the back scattered light comes from the lower is the energy level. The natural logarithmic decay of the back scattered energy level for a continuous length of fibre is enhanced by losses in the coupling from one fibre length to the next through the transducers, as well as loss by absorption in the transducer itself.

Figure 15:
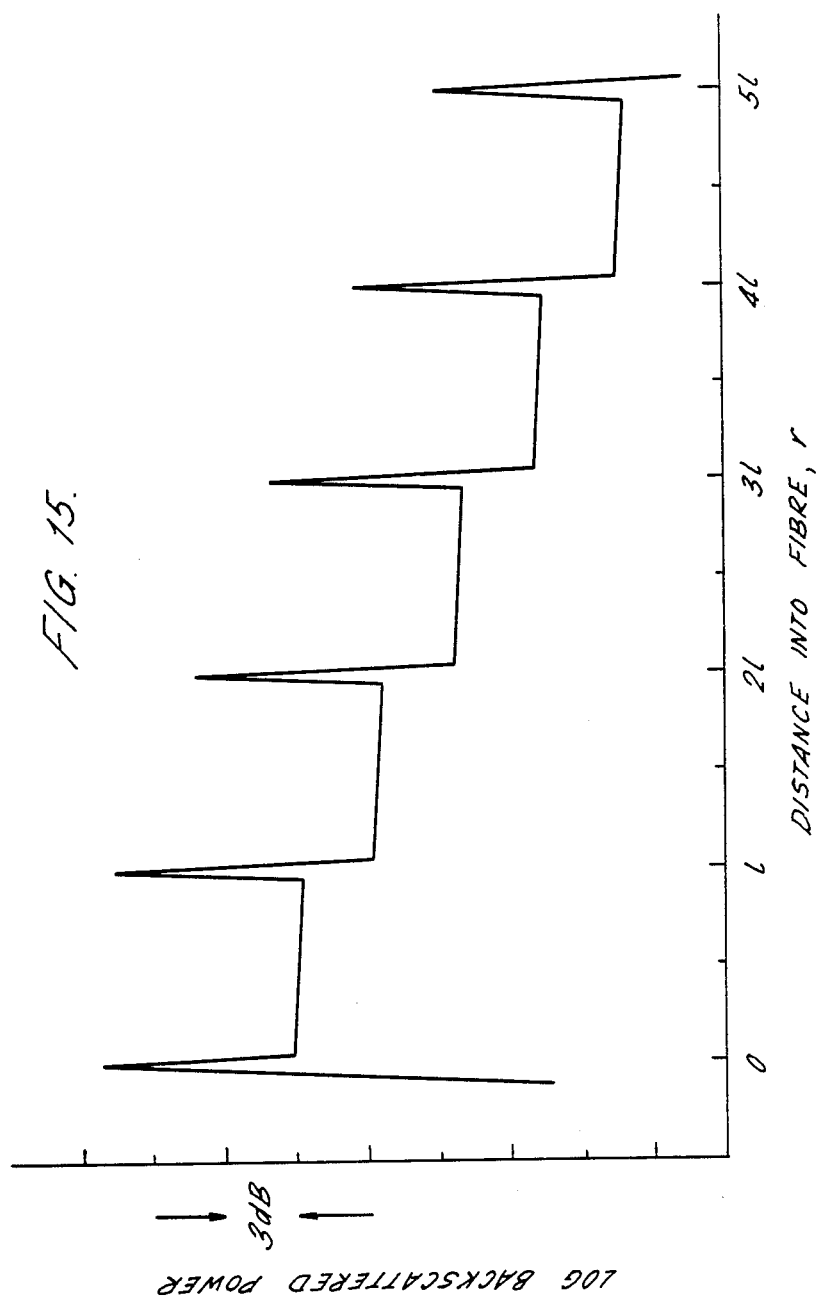
FIG. 15 is a graphical representation of the back scattered energy from a string of transducer elements interconnected by length of optical fibre.

FIG. 15 illustrates graphically the back scattered power with time (and hence distance r along the fibre string from the launching end), assuming a 3 dB loss at each sensor element. The sensor elements are spaced by fibre lengths 1. It can be seen that for a five element sensor, there is a 12 dB dynamic range in the back scattered power between the first and fifth sections of optical fibre.

The back scattered power from a particular fibre length can be increased by increasing the launching energy of the light pulse put into the fibre length The launching energy is however limited by the availability of high peak power light sources at the desired wavelengths.

Back scattered energy can also be increased by increasing the length of the input pulse. This has the further theoretical advantage of reducing the detection band width of back scattered energy thereby increasing the signal to noise ratio in the back scattered power, the electrical white noise being proportional to receiver band width. However, as the pulse length increases, the spatial resolution along the length of the fibre string also increases. For optical fibre sections betweeen adjacent transducers about 10 meters long, the input pulse duration has to be less than 100 ns.

Longer coded pulses could be employed using a suitable pulse compression technique on reception such as are known in pulse radar.

The signal to noise ratio at the detector can also be increased by reducing the noise component. Random noise can be reduced by averaging a large number of samples for successive transmitted pulses. Averaging over N samples reduces the RMS current noise by a factor $\sqrt{N}$.

Photon counting techniques might be used to count single photons from different parts of the fibre. A photo-multiplier detector is then employed. The number of photons received in a time period corresponding to a desired back scattering portion of the fibre string is accumulated over a great many transmitted light pulses (say 106).

The above described techniques for increasing the signal to noise ratio of the lowest energy back scattered signals all have limitations or are expensive and difficult.

Another approach is to optimise the available energy for the number of transducers required.

The back scattered energy is, inter alia, dependent on the scattering co-efficient of the fibre. The back scattered power in a particular segment of the optical fibre can be increased by increasing the scattering co-efficient. However, since scattering is effectively a loss to the forward propagation of the pulse, the scattering co-efficient also appears in the exponential loss factor of the back scattered energy. It can be shown that the back scattered power returning from a distance L along the length of a fibre is a maximum when the scattering co-efficient $\beta$ of the fibre is given by $\beta$ equals $\frac{1}{2}$L.

In a system such as described above, there is no need to maximise the back scattered power from the earlier fibre sections for which the power is in any case high enough for detection. Accordingly, one way of increasing the back scattered signal from the more distant fibre sections is to progressively increase the scattering co-efficient of each of these more distant sections. Ideally, the difference in the back scattered power from successive distant optical fibre sections should compensate for the attenuation the propagating light pulse suffers in propagating from one section to the next and back again (twice through the inter-linking transducer).

If this condition is satisfied for every pair of adjacent fibre sections, the back scattered power returning from the middle of all these fibre sections will be equal until the most remote fibre section for which the forward propagating power is insufficient even if totally reflected to compensate for losses.

Figure 16:
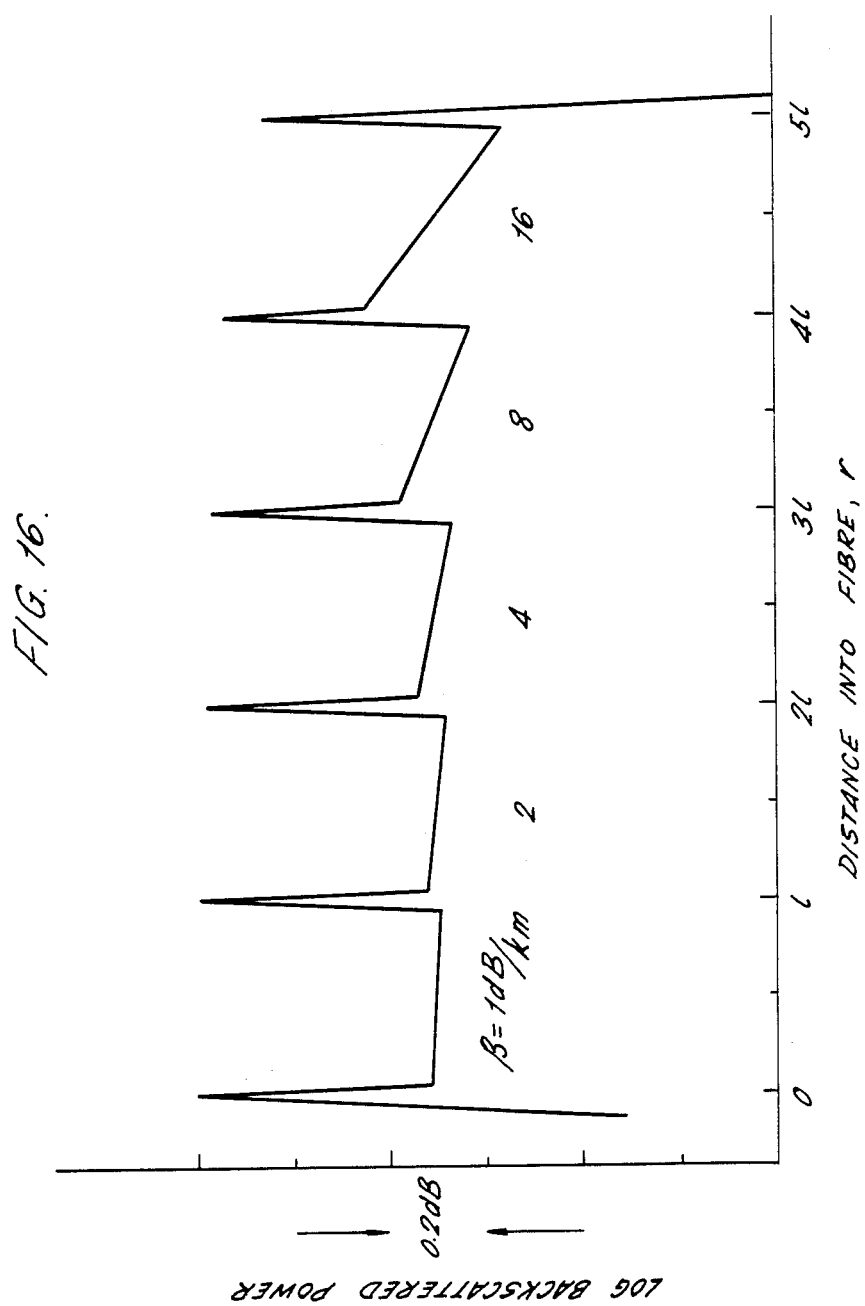
FIG. 16 is a graphical representation similar to FIG. 15 but with the back scattering co-efficient of successive fibre lengths increased to compensate for losses.

FIG. 16 shows the back scattered power returning from a 5 section fibre suffering from a 3 dB loss per transducer and with the scattering co-efficients of the successive fibre sections being 1, 2, 4, 8 and 16 dB km$^{-1}$. This shows that the back scattered power from the middle of each fibre section is kept approximately constant.

There is a further advantage of this arrangement, in that the linear response range for the photo-detector used in the apparatus can be significantly smaller.

However, there are also significant problems with increasing the scattering co-efficients of the fibre sections. For a 10 section optical fibre the scattering co-efficient of the tenth section would be 512 times higher than that of the first. The total loss of light travelling through one fibre section to the next would become excessive. It may also be difficult to produce the fibres with the desired scattering co-efficients.

Figure 17:
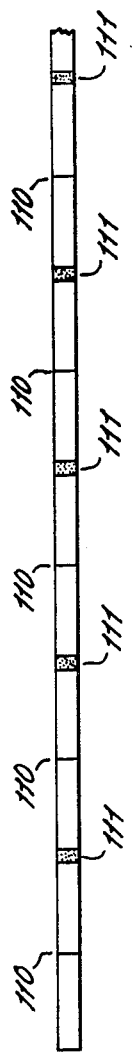
FIG. 17 illustrates an alternative technique for improving signals to noise ratio by introducing retro-reflecting elements in successive optical fibre lengths.

FIG. 17 illustrates an alternative arrangement employing optical fibre with relatively low scattering co-efficient, and consequently low forward propagation loss, but with retro-reflecting elements 110 located midway along the optical fibre sections interlinking adjacent transducers 111. The retro-reflecting elements 110 are arranged to reflect a predetermined proportion of light propagating forwards along the optical fibre back along the fibre in the opposite directions. The advantage of using such retro-reflectors arises from the fact that only a small proportion of the total light scattered in an optical fibre is actually recaptured for propagation in the reverse direction back to the launching end of the fibre. However substantially all retro-reflective light can be captured to propagate back down the fibre. It can be shown that for the same forward propagation loss, the reflective signal from a retro-reflecting element can be nearly four orders of magnitude higher than that of an equivalent back scattered signal. Thus, for the same forward propagation loss, the reflected signal from the optical fibres can be up to 40 dB greater.

Retro-reflecting elements 110 can be introduced in the length of the fibre, by providing a break in the fibre with accurately perpendicular end faces. Such a break separated by an air gap would produce a combined reflectivity of about 0.08. Lower values of reflectivity can be provided by joining the two end faces with an optical cement or fluid having the desired difference in refractive index. Higher reflectivities can be provided by depositing reflective coatings on one or both the fibre surfaces.

In a typical system employing retro-reflectors, reflectors are introduced only in the optical fibre segments furthest away from the launching end of the fibre string. Sufficient back scattered energy is obtained from the fibre length closest to the launching end for satisfactory monitoring of the transducer devices. When the signal to a noise ratio of the back scattered light from a fibre element at a certain distance from the launching end of the fibre string is reduced to a minimum desirable level, for adequate detection, retro-reflecting elements can be introduced in subsequent fibre segments. The reflectivity of successive reflectors can be increased so that the additional reflected power compensates for the loss in propagating from the preceding reflector and back again, twice through the transducer. If this condition is satisfied with every pair of adjacent reflectors, the reflected power returning to the launching end of the fibre string from all reflectors will be nominally equal (eg, if the transducer devices are all at the same standard temperature).

Figure 18:
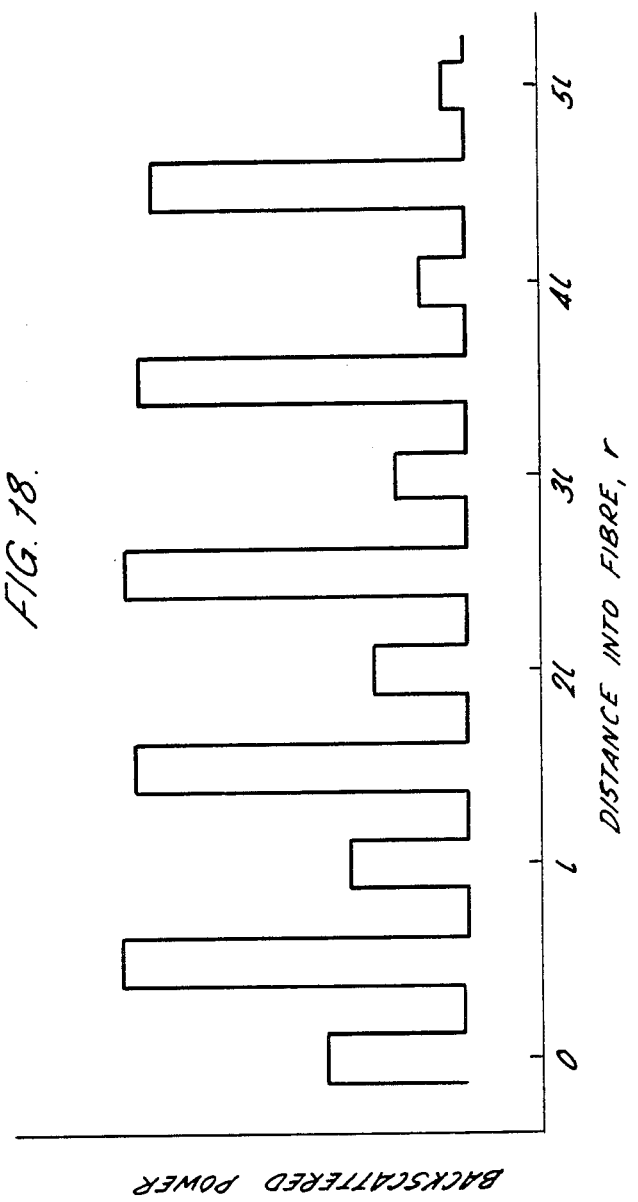
FIG. 18 is a graphical representation of the back scattered energy for an optical fibre string with retro-reflecting elements as shown in FIG. 17.

FIG. 18 illustrates the reflected power returning from a fibre string with ruby glass temperature transducers at joints between separate lengths of fibre and retro-reflectors at midpoints of these fibre lengths. The plotted back scattered energy is that derived from a rectangular pulse of light of duration corresponding to a quarter of the length l of the fibre segments between adjacent transducers. For values along the fibre string r equal 0, 1, 21, 31, 41 and 51, there are reflections originated from discontinuities at the transducer couplings. For intermediate values of r, corresponding to the positions of retro-reflectors, there are reflections produced by these retro-reflectors. The retro-reflectors have increasing reflection co-efficients so that the power of the reflected energy at successive reflectors is kept substantially constant.

If the reflected energy from each retro-reflector is arranged to be substantially constant, the dynamic range requirement of the detector of the apparatus can be very much reduced thereby avoiding non linearity problems.

I claim:

1. An apparatus for remotely measuring values of an external parameter at a plurality of locations from a monitoring position, said apparatus comprising:

an optical sensor means at each of the locations;

lengths of optical fiber serially interconnecting the sensor means to the monitoring position with the monitoring position at one end of the string of interconnected sensor means, the optical sensor means each being such as to permit light to pass from one optical fiber length to the next with a loss co-efficient through the sensor means which is dependent on the external parameter to be measured;

means for launching light pulses into the end of the optical fiber length at the monitoring position and monitoring backscattered energy emerging from said fiber end to determine said loss co-efficient at selected sensor means by optical time-domain reflectometry, said means for launching and monitoring including means to detect and measure the energy of the backscattered light;

timing means for controlling the detecting and measuring means to measure the backscattered energies at each of two temporally spaced times selected relative to the time of launching the light pulses to correspond to energy backscattered from a pair of points in the optical fiber lengths on opposite sides of a selected one of the sensor means; and computing means connected to receive from said detecting and measuring means signals representing the two measured backscattered energies and arranged to compute therefrom a value for said loss co-efficient and thence said external parameter which is normalized to minimize any dependence on the launching energy of the light pulse.

2. Apparatus as claimed in claim 1, wherein each of said sensing means is made of a material having a spectral absorption profile such that the sensing means provides at a first wavelength an absorption co-efficient which is dependent on said external parameter and at a second wavelength an absorption co-efficient which is substantially independent of said parameter, said means for launching and monitoring including light source means to launch a first pulse of light at the first wavelength and a second pulse of light at the second wavelength, means to detect and measure the energy of backscattered light at each of said two wavelengths, said computing means being connected to receive from said detecting and measuring means signals representing the four measured backscattered energies and arranged to compute therefrom a value for said parameter at the selected location, which value is normalized to minimize any dependency on influences between said points other than absorption.

3. Apparatus as claimed in claim 1, wherein a single continuous length of optical fiber constitutes both the interconnecting optical fiber and the sensing means.

4. An apparatus for remotely measuring values of an external parameter at a plurality of locations from a monitoring position, said apparatus comprising:

an optical sensor means at each of the locations;

lengths of optical fiber serially interconnecting the sensor means to the monitoring position with the monitoring position at one end of the string of interconnected sensor means, the optical sensor means each being such as to permit light to pass from one optical fiber length to the next with a loss co-efficient through the sensor means which is dependent on the external parameter to be measured;

means for launching light pulses into the end of the optical fiber length at the monitoring position and monitoring backscattered energy emerging from said fiber end to determine said loss co-efficients at selected sensor means by optical time-domain reflectometry, wherein each of said optical sensor means is made of a material having a spectral absorption profile such that the sensor means provides at a first wavelength an absorption co-efficient which is dependent on said external parameter and at a second wavelength an absorption co-efficient which is substantially independent of said parameter, said means for launching and monitoring including light source means to launch a first pulse of light at the first wavelength and a second pulse of light at the second wavelength;

means to detect and measure the energy of backscattered light at each of said two wavelengths to determine said loss co-efficients at selected sensor means at each wavelength; and computing means connected to receive from said detecting and measuring means signals representing the measured back-scattered energies at the two wavelengths and arranged to compute therefrom values for said external parameter which are normalized to minimize any dependence on loss co-efficients at the sensor means other than absorption.

5. Apparatus as claimed in claim 4 or claim 2, wherein the sensing means comprise optical sensor devices optically interconnecting separate lengths of the optical fiber, the optical sensing devices being formed as displacement transducers, each comprising a body of optical material having an absorption band including said first wavelength but excluding said second wavelength and having in a transmission direction through the body an absorption co-efficient at said first wavelength which is graduated in a translation direction transverse to the transmission direction, and means mounting the body so as to interconnect separate lengths of the optical fiber by an optical path through the body and to permit translational movement of the body relative to the optical path in said translation direction in accordance with the displacement to be measured, the body being formed of a first wedge of said optical material having a predetermined absorption co-efficient per unit distance in the material and a second wedge of substantially the same shape as the first and made of a material having substantially the same refractive index as the optical material of the first wedge and being highly transparent with substantially no absorption, the two wedges being cemented together to form a uniform thickness body.

6. Apparatus as claimed in claim 5, wherein the optical sensing devices additionally include temperature transducers, each comprising a further body of optical material through which the light passes and having an optical absorption spectrum with an absorption edge which is temperature dependent but extends over a range of wavelengths outside said absorption band, said second wavelength being selected to be away from said edge, said light source means being arranged additionally to launch a third pulse of light at a third wavelength on said absorption edge and said detecting and measuring means and said computing means being arranged additionally to measure said backscattered energies at a third wavelength and to compute a normalized value for the temperature from signals representing said backscattered energies at said third and second wavelengths.

7. Apparatus for optically measuring a displacement, comprising an optical displacement transducer, optical fiber means to feed light from a monitoring position to the transducer and to supply back to the monitoring position an optical signal generated by the transducer by modulation of said light fed thereto, the transducer comprising a body of optical material, optically interconnecting light from and to the optical fiber means by means of a light path through the body, and having in a transmission direction through the body an adsorption co-efficient which is graduated in a translation direction transverse to the transmission direction, and means mounting the body for translational movement of the body relative to the optical path in said translation direction in accordance with the displacement to be measured, thereby modulating the light passing through the body to generate said optical signal, said optical material having a spectral absorption profile such that the body has been graduated absorption co-efficient at a first wavelength, but is uniformly transparent at a second wavelength, said optical material having an absorption band which includes said first wavelength but excludes said second wavelength, and the apparatus including light source means at the monitoring position to feed light at each of said wavelengths along the optical fiber means to the transducer, whereby the displacement to be measured modulates the light at said first wavelength but not at said second wavelength and measuring means comparing the energies of light at the two wavelengths which is supplied back to the monitoring position after transmission through said body of optical material, to provide a value for said absorption co-efficient, and thence the displacement, which is normalized to minimize any dependence on loss co-efficients other than said absorption co-efficient.

8. Apparatus as claimed in claim 7, wherein the body is formed of a first wedge of said optical material having a predetermined absorption co-efficient per unit distance in the material and a second wedge of substantially the same shape as the first and made of a material having substantially the same refractive index as the optical material of the first wedge and being highly transparent with substantially no absorption, the two wedges being cemented together to form a uniform thickness body.

9. Apparatus as claimed in claim 7, and additionally for measuring temperature, comprising an optical temperature transducer comprising a further body of optical material through which the light passes and having an optical absorption spectrum with an absorption edge which is temperature dependent but extends over a range of wavelengths outside said absorption band, said second wavelength being selected to be away from said edge, said light source means being arranged additionally to feed light at a third wavelength on said absorption edge along the optical fiber, whereby the displacement modulates the light at said first wavelength but not at said second and third wavelengths and the temperature modulates the light at said third wavelength but not at said first and second wavelengths, said measuring means being arranged additionally to compare the energies of said light at the third and second wavelengths to provide a normalized value for the temperature.

10. An apparatus for remotely measuring values of an external parameter at a plurality of locations from a monitoring position, said apparatus comprising:

an optical sensor means at each of the locations;

lengths of optical fiber serially interconnecting the sensor means to the monitoring position with the monitoring position at one end of the string of interconnected sensor means, the optical sensor means each being such as to permit light to pass from one optical fiber length to the next with a loss co-efficient through the sensor means which is dependent on the external parameter to be measured;

means for launching light pulses into the end of the optical fiber length at the monitoring position and monitoring backscattered energy emerging from said fiber end to determine said loss co-efficients at selected sensor means by optical time-domain reflectometry, wherein each of said optical sensor means is made of a material having a spectral absorption profile such that the sensor means provides at a first wavelength on absorption co-efficient which is dependent on said external parameter and at a second wavelength an absorption co-efficient which is substantially independent of said parameter, said means for launching and monitoring including light source means to launch a first pulse of light at the first wavelength and a second pulse of light at the second wavelength;

means to detect and measure the energy of backscattered light at each of said two wavelengths to determine said loss co-efficients at selected sensor means at said wavelength;

and computing means connected to receive from said detecting and measuring means signals representing the measured backscattered energies at the two wavelengths and arranged to compute therefrom values for said external parameter which are normalized to minimize any dependence on loss co-efficients at the sensor means other than absorption, wherein the sensing means comprise optical sensor devices optically interconnecting separate lengths of the optical fiber, the optical sensing devices being formed as displacement transducers, each comprising a body of optical material having an absorption band including said first wavelength but excluding said second wavelength and having in a transmission direction through the body an absorption co-efficient at said first wavelength which is graduated in a translation direction transverse to the transmission direction, and means mounting the body so as to interconnect separate lengths of the optical fiber by an optical path through the body and to permit translational movement of the body relative to the optical path in said translation direction in accordance with the displacement to be measured, the body being formed of a first wedge of said optical material having a predetermined absorption co-efficient per unit distance in the material and a second wedge of substantially the same shape as the first and made of a material having substantially the same refractive index as the optical material of the first wedge and being highly transparent with substantially no absorption, the two wedges being cemented together to form a uniform thickness body.

11. Apparatus as claimed in claim 10, wherein the optical sensing devices additionally include temperature transducers, each comprising a further body of optical material through which the light passes and having an optical absorption spectrum with an absorption edge which is temperature dependent but extends over a range of wavelengths outside said absorption band, said second wavelength being selected to be away from said edge, said light source means being arranged additionally to launch a third pulse of light at a third wavelength on said absorpton edge and said detecting and measuring means and said computing means arranged additionally to measure said backscattered energies at a third wavelength and to compute a normalized value for the temperature from signals representing said backscattered energies at said third and second wavelengths.

12. An apparatus for remotely measuring values of an external parameter at a plurality of locations from a monitoring position, said apparatus comprising:

an optical sensor means at each of the locations;

lengths of optical fiber serially interconnecting the sensor means to the monitoring position with the monitoring position at one end of the string of interconnected sensor means, the optical sensor means each being such as to permit light to pass from one optical fiber length to the next with a loss co-efficient through the sensor means which is dependent on the external parameter to be measured;

means for launching light pulses into the end of the optical fiber length at the monitoring position and monitoring backscattered energy emerging from said fiber end to determine said loss co-efficient at selected sensor means by optical time-domain reflectometry, said means for launching and monitoring including means to detect and measure the energy of the backscattered light;

timing means for controlling the detecting and measuring means to measure the backscattered energies at each of two temporally spaced times selected relative to the time of launching the light pulses to correspond to energy backscattered from a pair of points in the optical fiber lengths on opposite sides of a selected one of the sensor means;

and computing means connected to receive from said detecting and measuring means signals representing the two measured backscattered energies and arranged to compute therefrom a value of said loss co-efficient and thence said external parameter which is normalized to minimize any dependence on the launching energy of the light pulse, wherein each of said sensing means is made of a material having spectral absorption profile such that the sensing means provides at a first wavelength an absorption co-efficient which is dependent on said external parameter and at a second wavelength an absorption co-efficient which is substantially independent of said parameter, said means for launching and monitoring including light source means to lauch a first pulse of light at the first wavelength and a second pulse of light at the second wavelength, and means to detect and measure the energy of backscattered light at each of said two wavelengths, said computing means being connected to receive from said detecting and measuring means signals representing the four measured backscattered energies and arranged to compute therefrom a value for said parameter at the selected location, which value is normalized to minimize any dependency on influences between said points other than absorption, and wherein the sensing means comprise optical sensor devices optically interconnecting separate lengths of the optical fiber, the optical sensing devices being formed as displacement transducers, each comprising a body of optical material having an absorption band including said first wavelength but excluding said second wavelength and having in a transmission direction through the body an absorption co-efficient at said first wavelength which is graduated in a translation direction transverse to the transmission direction, and means mounting the body so as to interconnect separate lengths of the optical fiber by an optical path through the body and to permit translational movement of the body relative to the optical path in said translation direction in accordance with the displacement to be measured, the body being formed of a first wedge of said optical material having a predetermined absorption co-efficient per unit distance in the material and a second wedge of substantially the same shape as the first and made of a material having substantially the same refraction index as the optical material of the first wedge and being highly transparent with substantially no absorption, the two wedges being cemented together to form a uniform thickness body.

13. Apparatus as claimed in claim 12, wherein the optical sensing devices additionally include temperature transducers, each comprising a further body of optical material through which the light passes and having an optical absorption spectrum with an absorption edge which is temperature dependent but extends over a range of wavelengths outside said absorption band, said second wavelength being selected to be away from said edge, said light source means being arranged additionally to launch a third pulse of light at a third wavelength on said absorption edge and said detecting and measuring means and said computing means arranged additionally to measure said backscattered energies at a third wavelength and to compute a normalized value for the temperature from signals representing said backscattered energies at said third and second wavelengths.

14. Apparatus for optically measuring a displacement, comprising an optical displacement transducer, optical fiber means to feed light from a monitoring position to the transducer and to supply back to the monitoring position on optical signal generated by the transducer by modulation of said light fed thereto, the transducer comprising a body of optical material, optically interconnecting light from and to the optical fiber means by means of a light path through the body, and having in a transmission direction through the body an absorption co-efficient which is graduated in a translation direction transverse to the transmission direction, and means mounting the body for translational movement of the body relative to the optical path in said translation direction in accordance with the displacement to be measured, thereby modulating the light passing through the body to generate said optical signal, said optical material having a spectral absorption profile such that the body has said graduated absorption co-efficient at a first wavelength but is uniformly transparent at a second wavelength, and having an absorption band which includes said first wavelength but excludes said second wavelength and the apparatus including light source means at the monitoring position to feed light at each of said wavelengths along the optical fiber means to the transducer, whereby the displacement to be measured modulates the light at said first wavelength but not at said second wavelength, and measuring means comparing the energies of light at the two wavelengths which is supplied back to the monitoring position after transmission through said body of optical material, to provide a value for said absorption co-efficient, and thence the displacement, which is normalized to minimize any dependence on loss co-efficients other than said absorption co-efficient, and wherein the body is formed of a first wedge of said optical material having a predetermined absorption co-efficient per unit distance in the material and a second wedge of substantially the same shape as the first and made of a material having substantially the same refractive index as the optical material of the first wedge and being highly transparent with substantially no absorption, the two wedges being cemented together to form a uniform thickness body.

* * * * *